(12) United States Patent
Choi et al.

(10) Patent No.: US 11,508,960 B2
(45) Date of Patent: Nov. 22, 2022

(54) LITHIUM METAL COMPLEX OXIDE AND MANUFACTURING METHOD OF THE SAME

(71) Applicant: ECOPRO BM CO., LTD., Cheongju-si (KR)

(72) Inventors: Moon Ho Choi, Cheongju-si (KR); Jong Hwan Park, Cheongju-si (KR); Gyeong Jae Heo, Cheongju-si (KR); Hyun Jong Yu, Cheongju-si (KR); Yonghwan Gwon, Cheongju-si (KR); Young Nam Park, Cheongju-si (KR); Eun Byeol Hyeong, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 0 days.

(21) Appl. No.: 16/198,985

(22) Filed: Nov. 23, 2018

(65) Prior Publication Data
US 2019/0157672 A1 May 23, 2019

(30) Foreign Application Priority Data

Nov. 23, 2017 (KR) .......................... 10-2017-0157765
Nov. 19, 2018 (KR) .......................... 10-2018-0142946

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/42* (2013.01); *H01M 4/131* (2013.01);
(Continued)

(58) Field of Classification Search
CPC ........ H01B 1/08; H01M 4/131; H01M 4/366; H01M 4/505; H01M 4/525; C01G 53/42;
(Continued)

(56) References Cited

U.S. PATENT DOCUMENTS 7,935,444 B2 * 5/2011 Chang .................. H01M 4/505
429/231.95
2007/0292761 A1 * 12/2007 Park ..................... H01M 4/505
429/223
(Continued)

FOREIGN PATENT DOCUMENTS

CN      105958062 A    9/2016
CN      106532038 A    3/2017
(Continued)

OTHER PUBLICATIONS

English machine translation of Ogawa et al. (JP 2007-213866 A). (Year: 2007).*
(Continued)

*Primary Examiner* — Matthew R Diaz
(74) *Attorney, Agent, or Firm* — Saliwanchik, Lloyd & Eisenschenk

(57) ABSTRACT

The present invention relates to a lithium metal complex oxide and a preparation method thereof, and more particularly, to a lithium metal complex oxide mixed with a metal compound for a lithium reaction, stirred and heat-treated to allow residual lithium and a metal compound for reducing lithium (or a metal compound for lithium reduction) to react with each other on a surface to form a product, which is included in the lithium metal complex oxide, in which the content of $Ni^{3+}$ is higher than the content of $Ni^{2+}$ and a ratio of $Ni^{3+}/Ni^{2+}$ is 1.5 or greater so that life characteristics and capacity characteristics are improved, while residual lithium is reduced, and a preparation method thereof.

1 Claim, 2 Drawing Sheets

(51) Int. Cl.
  *H01M 4/131* (2010.01)
  *H01M 4/36* (2006.01)
  *H01M 4/1391* (2010.01)

(52) U.S. Cl.
  CPC ......... *H01M 4/1391* (2013.01); *H01M 4/366* (2013.01); *C01P 2002/20* (2013.01); *C01P 2002/85* (2013.01); *C01P 2006/40* (2013.01)

(58) Field of Classification Search
  CPC ........ C01G 53/44; C01G 53/50; C01G 53/52; C01G 53/54; C01G 53/56; C01P 2002/20; C01P 2002/85; C01P 2006/40
  See application file for complete search history.

(56) References Cited

U.S. PATENT DOCUMENTS

| | | | | |
|---|---|---|---|---|
| 2010/0316910 | A1* | 12/2010 | Kajiyama | C01F 7/141 429/223 |
| 2014/0087261 | A1* | 3/2014 | Li | H01M 4/525 429/223 |
| 2014/0131617 | A1* | 5/2014 | Park | H01M 4/505 252/182.1 |
| 2014/0159675 | A1* | 6/2014 | Kodama | H01M 4/505 429/162 |
| 2015/0064563 | A1* | 3/2015 | Kim | C01G 53/50 429/223 |
| 2015/0171423 | A1* | 6/2015 | Kim | H01M 4/1391 429/220 |
| 2015/0214550 | A1* | 7/2015 | Song | H01M 4/1315 429/223 |
| 2016/0006025 | A1* | 1/2016 | Sun | C01G 53/42 252/182.1 |
| 2017/0358796 | A1* | 12/2017 | Kim | H01M 4/485 |
| 2018/0287135 | A1* | 10/2018 | Shin | H01M 10/052 |

FOREIGN PATENT DOCUMENTS

| | | | |
|---|---|---|---|
| CN | 106910881 A | | 6/2017 |
| JP | 2002260660 A | * | 9/2002 |
| JP | 2007213866 A | * | 8/2007 |
| JP | 2013125732 A | * | 6/2013 |
| KR | 10-2010-0018752 A | | 2/2010 |
| KR | 10-2014-0108615 A | | 9/2014 |
| KR | 10-2015-0026801 A | | 3/2015 |
| KR | 10-2015-0070853 A | | 6/2015 |
| WO | WO-2016108384 A1 | * | 7/2016 ........ H01M 10/0525 |
| WO | WO-2017095134 A1 | * | 6/2017 ............ H01M 4/36 |

OTHER PUBLICATIONS

Xu et al. ("The preparation and role of Li2ZrO3 surface coating LiNi0.5Co0.2Mn0.3O2 as cathode for lithium-ion batteries" Applied Surface Science 361, 2016, 150-156) (Year: 2016).*
English language machine translation of Kuzuo et al. (JP 2002-260660 A) (Year: 2002).*
English language machine translation of Komon et al. (JP 2013-125732 A) (Year: 2013).*
European Search Report dated Oct. 7, 2019 in European Application No. 18208156.2.
Schipper, F. et al., "Stabilizing nickel-rich layered cathode materials by a high-charge cation doping strategy zirconium-doped LiNi0.6Co0.2Mn0.2O2†," Journal of Materials Chemistry A, Sep. 13, 2016, 4:16073-16084.
Huang, Y. et al., "Enhanced electrochemical performance of LiNi0.8Co0.15Al0.05O2 by nanoscale surface modification with Co3O4," Electrochimica Acta, Feb. 14, 2017, 231: 294-299.
Liao, P. Y. et al., "Effect of Mn Content on the Microstructure and Electrochemical Performance of LiNi0.75-xCo0.25MnxO2 Cathode Materials," Journal of The Electrochemical Society, 2005, 152(9):A1695-A1700.
Zhang, Q. et al., "Pre-oxidizing the precursors of the Nickel-rich cathode materials to regulate their Li+/Ni2+ cation ordering towards cyclability improvements," Journal of Power Sources, 2018, 396:734-741.
Min, K. et al., "Residual Li Reactive Coating with Co3O4 for Superior Electrochemical Properties of LiNi0.91Co0.06Mn0.03O2 Cathode Material," Journal of The Electrochemical Society, Jan. 4, 2018, 165(2):A79-A85.
Ding, Y. et al., "Improved electrochemical performances of LiNi0.6Co0.2Mn0.2O2 cathode material by reducing lithium residues with the coating of Prussian blue," Journal of Alloys and Compounds, Oct. 2018, 774:451-460.
Office Action dated Mar. 29, 2022 in European Application No. 18 208 156.2.
Office Action dated Jan. 17, 2020 in Korean Application No. 10-2018-0142946.

* cited by examiner

LITHIUM METAL COMPLEX OXIDE AND MANUFACTURING METHOD OF THE SAME

CROSS REFERENCE TO RELATED APPLICATIONS

This application claims the benefit under 35 U.S.C. § 119 of Korean Application Nos. 10-2017-0157765, filed Nov. 23, 2017; and 10-2018-0142946, filed Nov. 19, 2018; which are hereby incorporated in their entirety.

BACKGROUND OF THE INVENTION

Field of the Invention

The present invention relates to a lithium metal complex oxide and a preparation method thereof, and more particularly, to a lithium metal complex oxide mixed with a metal compound for a lithium reaction, stirred and heat-treated to allow residual lithium and a metal compound for reducing lithium (or a metal compound for lithium reduction) to react with each other on a surface to form a product, which is included in the lithium metal complex oxide, in which the content of $Ni^{3+}$ is higher than the content of $Ni^{2+}$ and a ratio of $Ni^{3+}/Ni^{2+}$ is 1.5 or greater so that life characteristics and capacity characteristics are improved, while residual lithium is reduced, and a preparation method thereof.

DESCRIPTION OF THE RELATED ART

A battery generates electricity by using a material available for electrochemical reaction with a cathode and an anode. A typical example of such a battery is includes a lithium secondary battery that produces electrical energy according to a change in a chemical potential when lithium ions are intercalated/deintercalated in the cathode and the anode.

The lithium secondary battery is manufactured by using a material capable of reversible intercalation/deintercalation of lithium ions as a positive electrode and a negative electrode active material, and filling an organic electrolytic solution or a polymer electrolyte between the positive electrode and the negative electrode.

As a cathode active material of a lithium secondary battery, a lithium composite metal compound is used, and as an example thereof, composite metal oxides such as $LiCoO_2$, $LiMn_2O_4$, $LiNiO_2$, $LiMnO_2$, and the like, have been studied.

Among the above cathode active materials, $LiCoO_2$, having excellent life characteristics and charge/discharge efficiency, has most widely been used. However, $LiCoO_2$ has low structural stability and is high in price due to a limitation of cobalt used as a raw material thereof in terms of resource, having a limitation in price competitiveness.

Lithium manganese oxides such as $LiMnO_2$, $LiMn_2O_4$, and the like, advantageously have excellent thermal safety and low in price, but have small capacity and poor high temperature characteristics. In addition, a $LiNiO_2$-based cathode active material exhibits battery characteristics of high discharge capacity but is significantly difficult to synthesize due to a problem of cation mixing between lithium (Li) and a transition metal, thus having significant problem of rate characteristics.

Also, as a large amount of Li by-products is produced depending on the degree of cation mixing, and most of the Li by-products are formed as a compound of LiOH and $Li_2CO_3$, causing a cathode paste to become gel and generating a gas as charging/discharging is performed after an electrode is manufactured. Residual $Li_2CO_3$ increases a swelling phenomenon of a cell to reduce a cycle and cause a battery to swell. Thus, a technique capable of solving such problems is required.

In the related art, in order to solve the problems, rinsing is performed to rinse a cathode active material with distilled water, or the like. Here, however, performing rinsing may reduce residual lithium but electrochemical performance is degraded due to rinsing.

SUMMARY

An aspect of the present invention provides a lithium metal complex oxide in which the content of $Ni^{2+}$ and $Ni^{3+}$ ions on a surface is controlled.

Another aspect of the present invention provides a lithium metal complex oxide including a lithium compound formed as residual lithium on a surface reacts with a metal compound for lithium reduction.

Another aspect of the present invention provides a method for preparing a lithium metal complex oxide.

According to an aspect of the present invention, there is provided a cathode active material in which the ion content of $Ni^{2+}$ and $Ni^{3+}$ on a surface are adjusted. In the lithium metal complex oxide according to the present invention, the content of $Ni^{3+}$ is higher than the content of $Ni^{2+}$ and a ratio of $Ni^{3+}/Ni^{2+}$ may be 1.5 or greater.

As illustrated in FIG. 1, in the cathode active material having a layered structure, $Ni^{3+}$ is positioned in the layered structure, $Ni^{2+}$ and $Ni^{3+}$ coexist in the lithium nickel-cobalt-aluminum oxide layer, and some $Ni^{2+}$ are present between the layers and inserted in reversible lithium layer. That is, in this structure, Ni ions inserted into the reversible lithium layer are all $Ni^{2+}$, and a value of the oxidation number of the Ni ions inserted into the reversible lithium layer is not changed.

In the cathode active material according to the present invention, the content of $Ni^{3+}$ may be greater than the content of $Ni^{2+}$, the ratio of $Ni^{3+}/Ni^{2+}$ may be 1.5 or greater, a mole fraction of $Ni^{2+}$ inserted and bonded to the reversible lithium layer may be 0.03 to 0.07 with respect to a total amount of Li bond sites of the reversible lithium layer, and the content of $Ni^{2+}$ is 40% or less when XPS-analyzed. If the mole fraction of $Ni^{2+}$ is too small, the mole fraction of $Ni^{2+}$ inserted and bonded to the lithium layer is insufficient, making a crystal structure unstable to degrade cycle characteristics, and conversely, if the mole fraction of $Ni^{2+}$ is too large, capacity may be degraded, which are thus undesirable.

The present invention also provides a cathode active material including a lithium compound, which is produced as residual lithium in the cathode active material and a metal compound for lithium reduction react with each other, on a surface thereof.

The lithium metal complex oxide is represented by Chemical Formula 1 below.

$$Li_{1+a}Ni_{1-x-y}M1_xM2_yO_2 \qquad \text{<Chemical Formula 1>}$$

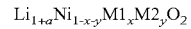

(Here, M1 is Co or Mn, M2 is one or more elements selected from the group consisting of Al, Mn, Mg, Si, P, V, W, Zr, Ba, and Ga, −0.2≤a≤0.5, 0.01≤x≤0.5, and 0.01≤y≤0.2).

In the present invention, the lithium compound produced as residual lithium in the lithium metal complex oxide and the metal compound for lithium reduction react with each other may be represented by Chemical Formula 2 below.

$$Li_a\text{-}M'_b\text{-}M''_c\text{-}O_d \qquad \text{<Chemical Formula 2>}$$

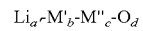

(Here, M' is Al or Mn, M" includes one or more elements selected from the group consisting of Co, Ba, B, Ti, Mn, Mg, Fe, Cu, Ag, Ca, Na, K, In, Ga, Ge, V, Mo, Nb, Si, W, and Zr, $0 \le a' \le 3$, $0 \le b \le 2$, $0 \le c \le 10$, and $0 \le d \le 10$).

The present invention includes a lithium compound represented by Chemical Formula 2 on a surface of the cathode active material represented by Chemical Formula 2, and a crystal structure of the cathode active material of Chemical Formula 1 and a crystal structure of the lithium compound of Chemical Formula 2 may be different.

In the present invention, the lithium compound produced as residual lithium and the compound for lithium reduction may be one selected from the group consisting of $LiCoO_2$, $LiAlO_2$, $LiCOPO_4$, $Li_3PO_4$, $Li_2TiO_3$, $LiTi_2(PO)_4$, $LiTi_7O_4$, $LiTi_2O_4$, $Li_6Zr_3O_9$, $Li_2ZrO_3$, $Li_2VO_3$, $LiCoTiO_2$, $Li_2NiO_3$, $LiNiO_2$, $Ba_{19}Li_{44}$, $BaLi_4$, $Li_3VO_4$, $LiVP_2O_7$, $LiMn_2O_4$, $Li_2MnO_3$, $LiMnP_2O_7$, $Li_2MnP_2O_2$, $Li_4WO_5$, and $Li_2WO_4$.

In the present invention, the metal compound for lithium reduction may be represented by MOH, MOOH, and $MO_x$ (Here, M is selected from the group consisting of Co, Ni, Al, Ba, B, Ti, Mn, Mg, Fe, Cu, Ag, Ca, Na, K, In, Ga, Ge, V, Mo, Nb, Si, and Zr, and $0.001 \le x \le 2$). During a process of preparing the lithium metal complex oxide according to the present invention, the compound for lithium reduction may be mixed in a solid state. That is, the metal compound for lithium reduction may be a compound which may react with residual lithium, in a solid state.

The present invention also provides a method for preparing a lithium metal complex oxide including: preparing a lithium metal complex oxide; mixing the lithium metal complex oxide with a metal compound for lithium reduction; and stirring a mixture of the lithium metal complex oxide and the metal compound for lithium reduction, while applying energy thereto.

In the method for preparing a lithium metal complex oxide, the metal compound for lithium reduction may be selected from the group consisting of $Co_3O_4$, CoOOH, $Co(OH)_2$, and $CoSO_4$.

In the method for preparing a lithium metal complex oxide, the lithium metal complex oxide and the metal compound for lithium reduction may be mixed in a solid state.

That is, in the method for preparing a lithium metal complex oxide, the metal compound for lithium reduction in a solid state and the cathode active material react with each other to reduce residual lithium, while inhibiting a degradation of capacity which occurs in the related art rinsing process.

In the method for preparing a lithium metal complex oxide, a lithium compound having a crystal structure different from a cathode active material may be produced through a reaction by stirring a mixture of the lithium metal complex oxide and the metal compound for lithium reduction, while applying energy thereto.

The lithium metal complex oxide according to the present invention may include a lithium compound having a structure different from that of the cathode active material produced as residual lithium on a surface and the compound for reducing residual lithium in a solid state react with each other, and thus, the ion content of $Ni^{2+}$ and $Ni^{3+}$ on the surface may be adjusted, reducing residual lithium, and a degradation due to the related art rinsing process for reducing residual lithium is inhibited, significantly increasing capacity.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, examples of the present invention will be described in detail. However, the following examples are for illustrative purposes only and are not intended to limit the scope of the present invention. Any technical concept having substantially the same constitution as the technical idea described in the claims of the present invention and achieving the same operational effect is included in the scope of the present invention.

<Inventive Example> Preparation of Lithium Metal Complex Oxide

Precursors represented by $NiCo(OH)_2$ and $NiCoAl(OH)_2$ were prepared to prepare a lithium metal complex oxide by a coprecipitation reaction.

LiOH and $Li_2CO_3$ were added as lithium compounds to the prepared precursors and heat-treated to prepare a cathode active material for a lithium secondary battery.

$Co(OH)_2$, CoOOH, $Co_3O_4$, and $CoSO_4$ were mixed with the prepared lithium metal complex oxide and the compound for lithium reduction and the mixture was stirred, while applying energy thereto.

The compound for lithium reduction mixed with the lithium metal complex oxide prepared thusly are shown in Table 1 below.

TABLE 1

|  | Lithium metal complex oxide | Compound for lithium reduction | Rinsing |
|---|---|---|---|
| Inventive Example-1 | $LiNi_{1-(x+y)}Co_xAl_yO_2$ | $Co_3O_4$ | x |
| Inventive Example-2 | $LiNi_{1-(x+y)}Co_xAl_yO_2$ | CoOOH | x |
| Inventive Example-3 | $LiNi_{1-(x+y)}Co_xAl_yO_2$ | $Co(OH)_2$ | x |
| Comparative Example-1 | $LiNi_{1-(x+y)}Co_xAl_yO_2$ | $Co_3O_4$, $CoSO_4$ | o |
| Comparative Example-2 | $LiNi_{1-(x+y)}Co_xAl_yO_2$ | x | o |
| Comparative Example-3 | $LiNi_{1-(x+y)}Co_xAl_yO_2$ | x | x |

Comparative Example

A cathode active material of Comparative Example 1 was prepared in the same manner as that of Inventive Example 1, except that rinsing was performed with a solution including $Co_3O_4$ or $CoSO_4$ salt after the active material was prepared.

A cathode active material of Comparative Example 2 was prepared by performing rinsing with distilled water not including cobalt after the active material was prepared without mixing $Co_3O_4$ as a compound for lithium reduction.

A cathode active material of Comparative Example 3 was prepared without mixing a compound for lithium reduction and without performing rinsing after the active material was prepared.

<Experimental Example> XPS Measurement

Figure 1:
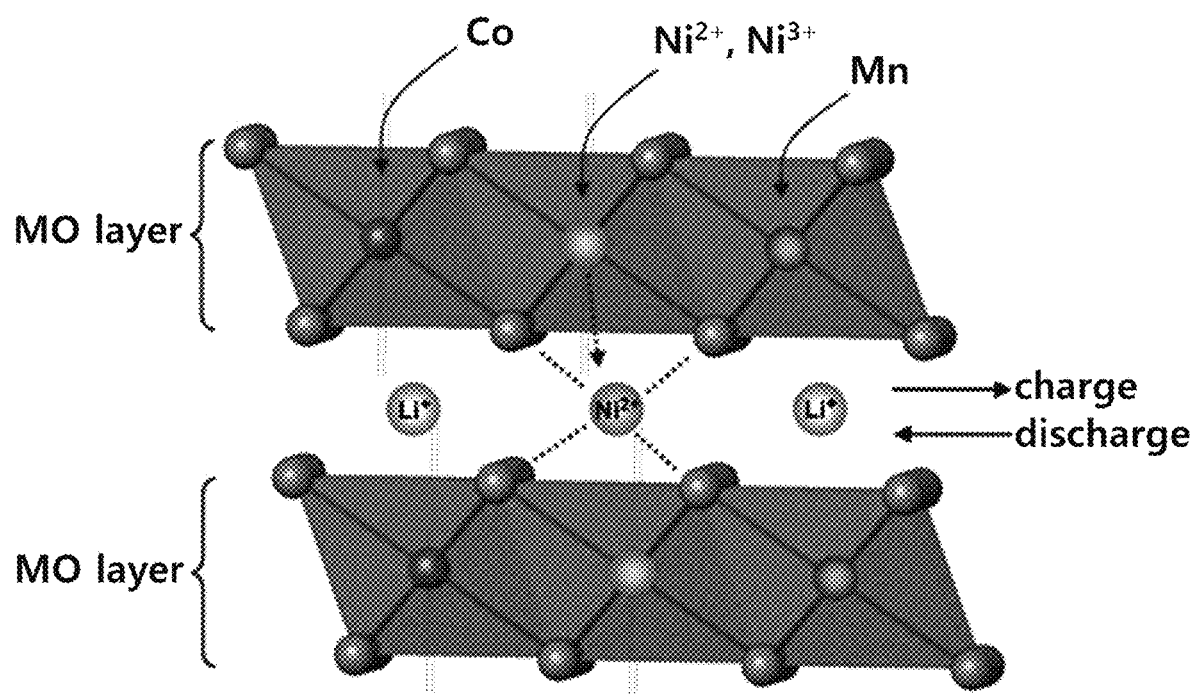
FIG. 1 illustrates an action of $Ni^{2+}$ and $Ni^{3+}$ in a layered cathode active material.
Figure 2:
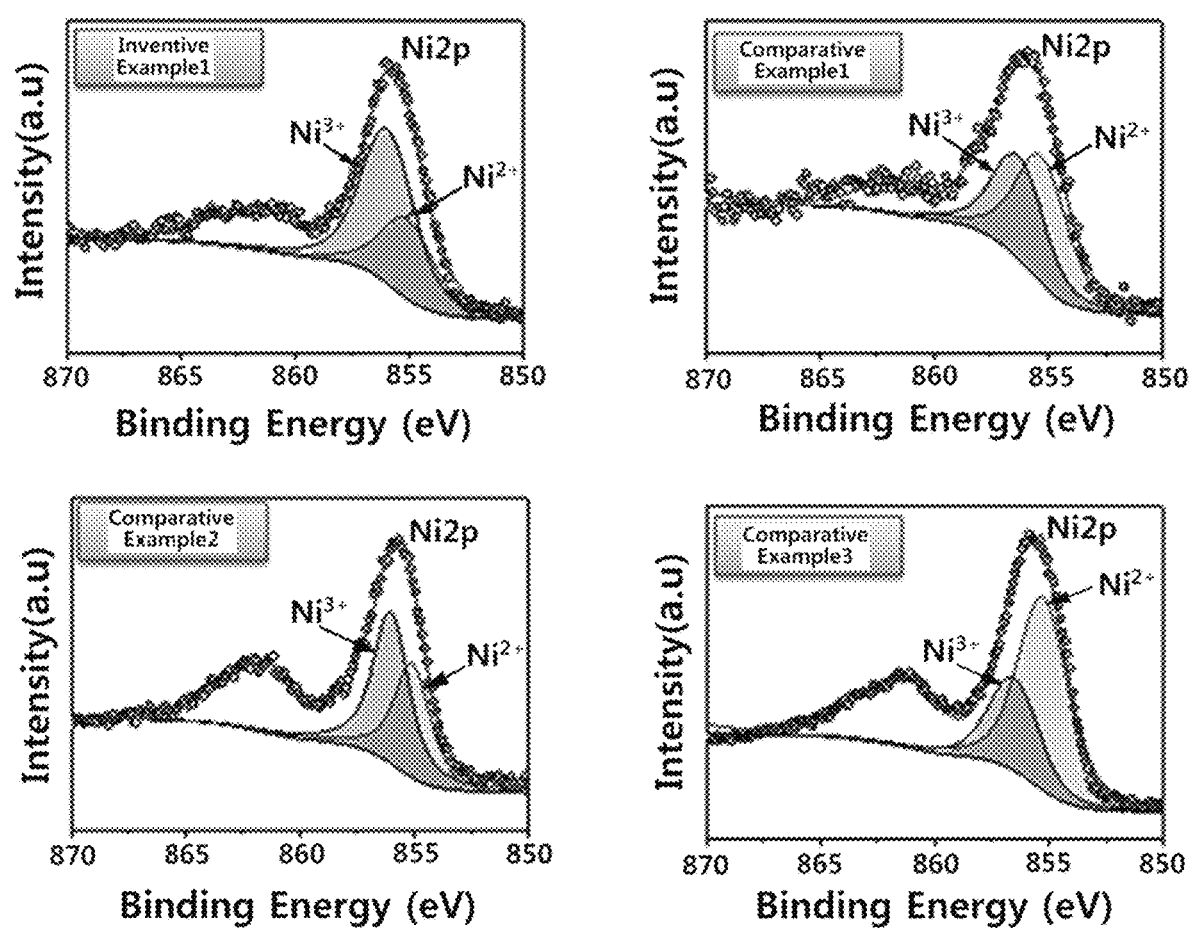
FIG. 2 is a graph illustrating a result of measuring a distribution of $Ni^{2+}$ and $Ni^{3+}$ in a lithium metal complex oxide prepared in an embodiment of the present invention through XPS.

XPS of the cathode active materials for a secondary battery prepared in the above Inventive Examples and Comparative Examples was measured and results thereof are shown in FIG. 2 and Table 2 below.

It can be seen that, in the case of solid phase mixing with the compound for lithium reduction without rinsing according to the present invention, the content of $Ni^{3+}$ was significantly increased, relative to $Ni^{2+}$, and the ratio of $Ni^{3+}/Ni^{2+}$ was the highest.

TABLE 2

| Classification | XPS analysis | | |
|---|---|---|---|
| | $Ni^{3+}$ | $Ni^{2+}$ | $Ni^{3+}/Ni^{2+}$ |
| Inventive Example-1 | 66.0% | 34.0% | 1.94 |
| Comparative Example-1 | 44.1% | 55.9% | 0.79 |
| Comparative Example-2 | 32.4% | 67.6% | 0.48 |
| Comparative Example-3 | 53.7% | 46.3% | 1.16 |

<Experimental Example> Measurement of Residual Lithium

Residual lithium of the cathode active materials prepared according to the above Inventive Examples and Comparative Examples was measured.

Specifically, 10 g of a prepared lithium metal complex oxide was immersed in 100 g of distilled water and stirred for 10 minutes. After stirring was finished, the product was filtered to obtain a filtrate, to which 0.1 M of HCl solution was added to be titrated to pH 5.

Here, the volume of the added HCl solution was measured to analyze residual lithium of the cathode active materials for a secondary battery, and results thereof are illustrated in Table 3 below.

TABLE 3

| Classification | Residual lithium (ppm) | | |
|---|---|---|---|
| | LiOH | $Li_2Co_3$ | free Li |
| Inventive Example-1 | 5021 | 6990 | 0.178 |
| Inventive Example-2 | 4948 | 7270 | 0.178 |
| Inventive Example-3 | 5012 | 6978 | 0.178 |
| Comparative Example-1 | 1311 | 1598 | 0.045 |
| Comparative Example-2 | 629 | 1628 | 0.026 |
| Comparative Example-3 | 7033 | 9914 | 0.250 |

<Manufacturing Example> Manufacturing of Battery

A battery was prepared using the cathode active materials prepared in the above Inventive Examples and Comparative Examples.

First, a secondary battery cathode active material, super-P as a conductive material, and polyvinylidene fluoride (PVdF) as a binder were mixed at a weight ratio of 95:5:3 to prepare a slurry. The prepared slurry was uniformly applied to an aluminum foil having a thickness of 15 μm and vacuum-dried at 135° C. to prepare a cathode for a lithium secondary battery.

A coil battery was manufactured using the obtained cathode for a lithium secondary battery, a lithium foil as a counterpart electrode, a porous polyethylene film (Celguard LLC., Celguard 2300) having a thickness of 25 μm as a separator, and a solvent including ethylene carbonate and ethylmethylcarbonate mixed in the volume ratio of 3:7 and including $LiPF_6$ having a concentration of 1.15M as a liquid electrolyte.

<Experimental Example> Measurement of Battery Characteristics—Capacity Characteristics Initial capacities of batteries including the cathode active materials of the present invention prepared in Inventive Examples and cathode active materials of Comparative Examples were measured and results thereof are shown in Table 4.

TABLE 4

| Classification | $1^{st}$ charge/discharge (0.15 C., 3.0~4.25 V @25° C.) | | |
|---|---|---|---|
| | Charge mAh/g | Discharge mAh/g | Efficiency % |
| Inventive Example-1 | 229.5 | 205.8 | 89.7 |
| Inventive Example-2 | 229.0 | 205.4 | 89.7 |
| Inventive Example-3 | 229.2 | 205.2 | 89.5 |
| Comparative Example-1 | 230.2 | 201.1 | 87.4 |
| Comparative Example-2 | 229.1 | 199.4 | 87.0 |
| Comparative Example-3 | 230.1 | 203.9 | 88.6 |

<Experimental Example> Measurement of Battery Characteristics—Life Characteristics and High-Temperature Storage Characteristics Life characteristics and high-temperature storage characteristics of the batteries including the cathode active materials of the present invention prepared in Inventive Examples and the cathode active materials of Comparative Examples were measured by resistance before and after storage, and results thereof are shown in Table 5 and Table 6.

TABLE 5

| Classification | Life time (@100 cycle) Room temperature ((1 C., 3.0~4.25 V) % |
|---|---|
| Inventive Example-1 | 93.1 |
| Inventive Example-2 | 93.3 |
| Inventive Example-3 | 93.9 |
| Comparative Example-1 | 78.9 |
| Comparative Example-2 | 72.3 |
| Comparative Example-3 | 87.8 |

TABLE 6

| Classification | Life time Imp | |
|---|---|---|
| | 1st Ω | 100th Ω |
| Inventive Example-1 | 2.9 | 12.3 |
| Inventive Example-2 | 2.0 | 11.3 |
| Inventive Example-3 | 1.9 | 11.5 |
| Comparative Example-1 | 3.6 | 19.9 |
| Comparative Example-2 | 22.0 | 51.5 |
| Comparative Example-3 | 4.7 | 37.6 |

In Table 5 and Table 6, it can be seen that the life characteristics of Inventive Examples according to the present invention were significantly improved, as compared with Comparative Examples.

What is claimed is:

1. A lithium metal complex oxide comprising:
   $Ni^{3+}$ and $Ni^{2+}$, wherein a ratio of a content of $Ni^{3+}$ to a content of $Ni^{2+}$ is 1.5 or greater on a surface of the lithium metal complex oxide,
   wherein the lithium metal complex oxide comprises an oxide represented by Chemical Formula 1 below and a lithium compound represented by Chemical Formula 2 below,
   wherein the lithium compound represented by the Chemical Formula 2 below is disposed on the surface of the oxide represented by the Chemical Formula 1 below, and
   wherein the lithium compound represented by the Chemical Formula 2 below has a crystal structure different from a crystal structure of the oxide represented by the Chemical Formula 1 below:

$$Li_{1+a}Ni_{1-x-y}M1_xM2_yO_2, \quad \text{<Chemical Formula 1>}$$

where M1 is Co or Mn, M2 is one or more elements selected from the group consisting of Al, Mn, Mg, Si, P, V, W, Zr, Ba, and Ga, $-0.2 \le a \le 0.5$, $0.01 \le x \le 0.5$, and $0.01 \le y \le 0.2$, and $$Li\,a'\text{-}M''c\text{-}Od, \text{ and} \quad \text{<Chemical Formula 2>}$$

where the lithium compound represented by the Chemical Formula 2 is one selected from the group consisting of $LiTi_7O_4$ and $LiTi_2O_4$.

* * * * *